United States Patent [19]

Tsugei et al.

[11] Patent Number: 4,890,258
[45] Date of Patent: Dec. 26, 1989

[54] SCHEDULE SETTING METHOD

[75] Inventors: Shinji Tsugei; Shigeki Iguchi; Tomohiro Inoue, all of Nara, Japan

[73] Assignee: Sharp Kabushiki Kaisha, Osaka, Japan

[21] Appl. No.: 183,500

[22] Filed: Apr. 14, 1988

Related U.S. Application Data

[63] Continuation of Ser. No. 743,685, Jun. 11, 1985, abandoned.

[30] Foreign Application Priority Data

Jun. 11, 1984 [JP] Japan ............................... 59-119642

[51] Int. Cl.⁴ .............................................. G06F 9/00
[52] U.S. Cl. ................................................... 364/900
[58] Field of Search ......................................... 364/200

[56] References Cited

U.S. PATENT DOCUMENTS

| | | | |
|---|---|---|---|
| 2,867,274 | 1/1959 | Taylor | 368/41 |
| 3,233,401 | 2/1966 | Hoffman et al. | 368/41 |
| 4,117,542 | 9/1978 | Klausner et al. | 364/900 |
| 4,151,596 | 4/1979 | Howells | 364/709 |
| 4,224,615 | 9/1980 | Penz | 340/712 |
| 4,385,291 | 5/1983 | Piguet | 340/712 |
| 4,402,056 | 8/1983 | Sado et al. | 364/705 |
| 4,421,418 | 12/1983 | Morishima | 368/69 |
| 4,459,036 | 7/1984 | Sado et al. | 368/251 |
| 4,520,357 | 5/1985 | Castleberry et al. | 340/783 |
| 4,548,510 | 10/1985 | Levine | 368/10 |
| 4,626,836 | 12/1986 | Curtis et al. | 340/706 |
| 4,639,720 | 1/1987 | Rympalski et al. | 340/712 |
| 4,649,499 | 3/1987 | Sutton et al. | 364/518 |

Primary Examiner—Gareth D. Shaw
Assistant Examiner—John G. Mills
Attorney, Agent, or Firm—Birch, Stewart, Kolasch & Birch

[57] ABSTRACT

A schedule setting method including the steps of writing schedule information by hand on a display combined with a digitizer, the schedule informaiton including a schedule starting time, a schedule ending time, and the contents of a schedule, detecting the locus of the handwritten schedule information, storing the schedule information in a memory, and alarming a user of the schedule information prior to the arrival of the schedule starting time.

3 Claims, 4 Drawing Sheets

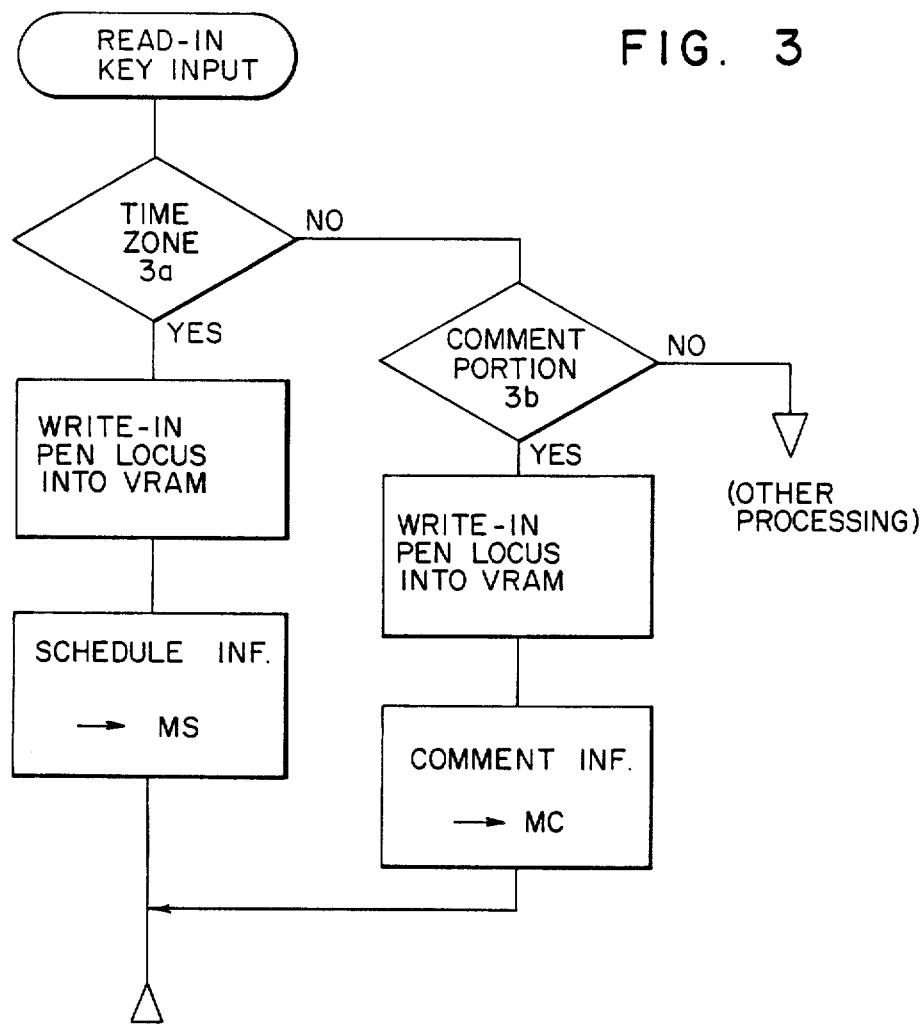

| MC | |
|---|---|
| DATE | COMMENT INFORMATION |
| | |
| | |

ND METHOD

This application is a continuation of application Ser. No. 743,685, filed on June 11, 1985, now abandoned.

BACKGROUND OF THE INVENTION

The present invention relates to a schedule setting method for setting schedule information and, more particularly, to an improved schedule setting method for setting and then announcing schedule information by a schedule announcing device.

Conventionally, schedule information is set by operating a key input device or selecting time information consisting of hour, minute, and second in a schedule switch. However, conventional devices are disadvantageous in that the setting of the schedule information is complicated.

Therefore, it is desired that an improved schedule setting method be provided which needs only a simple operation.

SUMMARY OF THE INVENTION

Accordingly, it is an object of the present invention to provide an improved schedule setting method in a schedule control device.

It is another object of the present invention to provide an improved schedule setting method for setting and then announcing schedule information in a schedule announcing device including a handwriting detection device through which the schedule information is written by hand.

Briefly described, in accordance with the present invention, a schedule setting method comprises the steps of writing schedule information by hand on a display such as a liquid crystal display combined with a digitizer, the schedule information including a schedule starting time, a schedule ending time, and the contents of the schedule, detecting the locus of the handwritten schedule information, storing the schedule information in a memory, and alarming a user of the scheduled information prior to the arrival of the schedule starting time.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3 and 6 are a flow chart indicative of executing a program in a read only memory (ROM); and FIGS. 4 and 5 are a schematic representation of the contents of a random access memory (RAM).

DESCRIPTION OF THE PREFERRED EMBODIMENT

Figure 1:
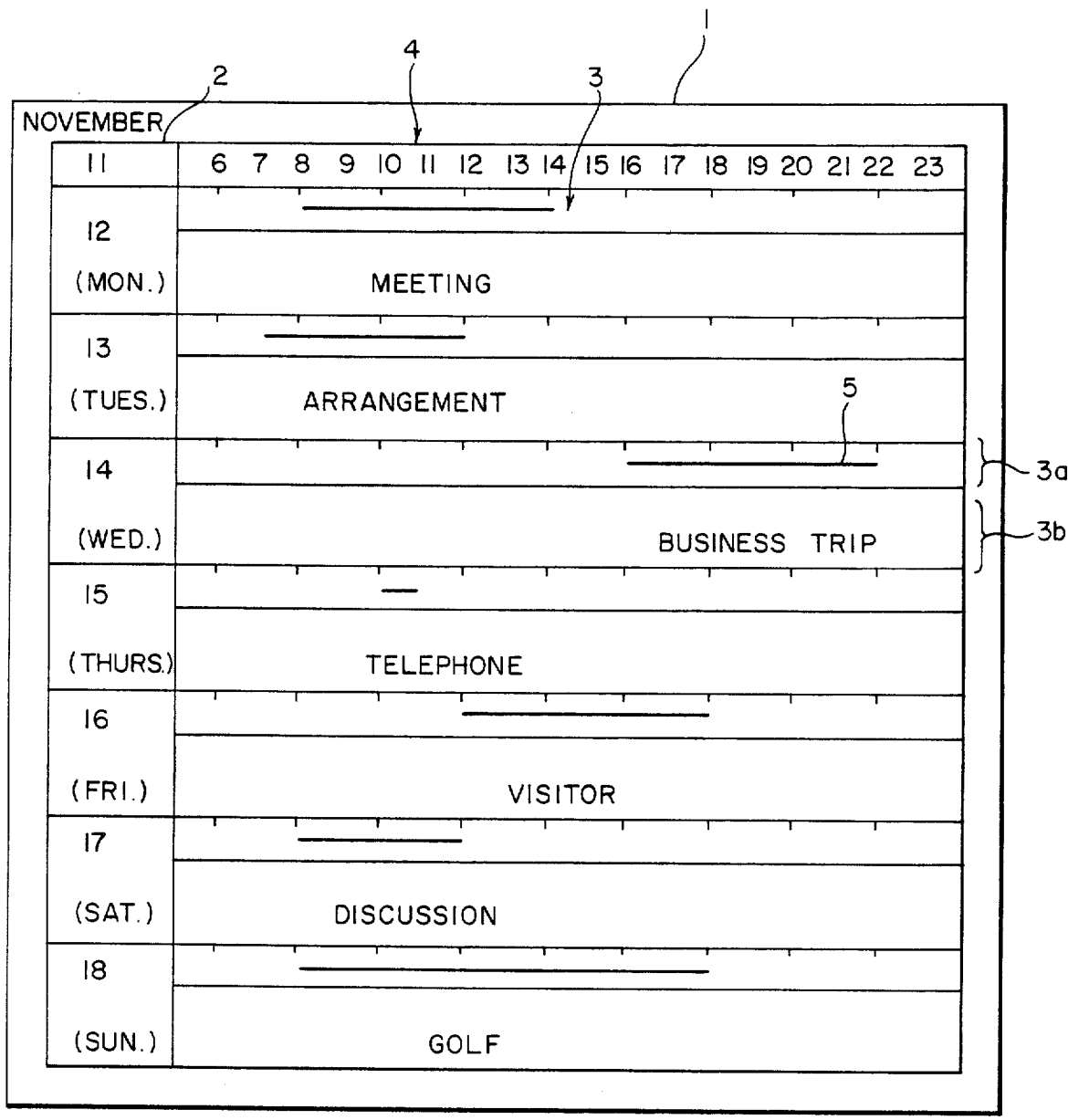
FIG. 1 is a plan view of a display such as a liquid crystal display used for a schedule setting plate in a schedule setting device according to the present invention.

FIG. 1 is a plan view of a display such as a liquid crystal display combined with a tablet called a digitizer for detecting the form of a handwritten letter and figure. The liquid crystal display panel comprises a schedule note portion 1 on which schedule information is noted according to the time of the schedule of 6 to 23 o'clock in connection with each of the seven days in a week. The schedule note portion 1 has, at its left, a date portion 2 displayed with the liquid crystal display for indicating the days, a schedule note portion 3 for each of the seven days, the note portion 3 being provided with scales corresponding to time information of 6 to 23 o'clock, and a time display portion 4 displayed with the liquid crystal display to show the time information.

At the upper portion of the date portion 3, a time information zone 3a is provided in which scales corresponding to time information of 6 to 23 o'clock are labeled. At the lower portion of the date portion 3, a comment portion 3b is provided to which any comment indicative of the contents of a schedule are written by hand.

According to the present invention, the note portion 3 is disposed on a tablet called a digitizer. In other words, the tablet is provided under the schedule note portion 3 of the liquid crystal display panel. This tablet is of an electromagnetic induction type and its structure is conventional as used in a digitizer, which comprises a wiring substrate having X-direction loop coils on one surface and Y-direction loop coils on the other surface. A switching controller is provided on the substrate, which comprises an analog switching Integrated Circuit. An end of each of the X- and Y-direction loop lines is shortcircuited. Every line of the X- and Y-direction loop coils is isolated from and in parallel with one another on one surface. The X- and Y-direction loop coils are embedded in the tablet. Upon the contact of an exciting pen on the liquid crystal display panel, an electromotive force is induced in the respective loop coils. The address of a specific loop coil receiving a maximum value of the electromotive force is given into the apparatus as the coordinate of the exciting pen in contact therewith. The liquid crystal display panel and the tablet thereunder are layered and integrated together.

The exciting pen is operated for drawing a schedule line covering the schedule period and writing a comment indicative of the contents of the schedule. The tablet can detect the handwritten line and the locus of the handwritten letter. As described below, according to the signals outputted from the tablet indicative of the locus, an alarm is developed once the schedule starting time arrives.

Figure 2:
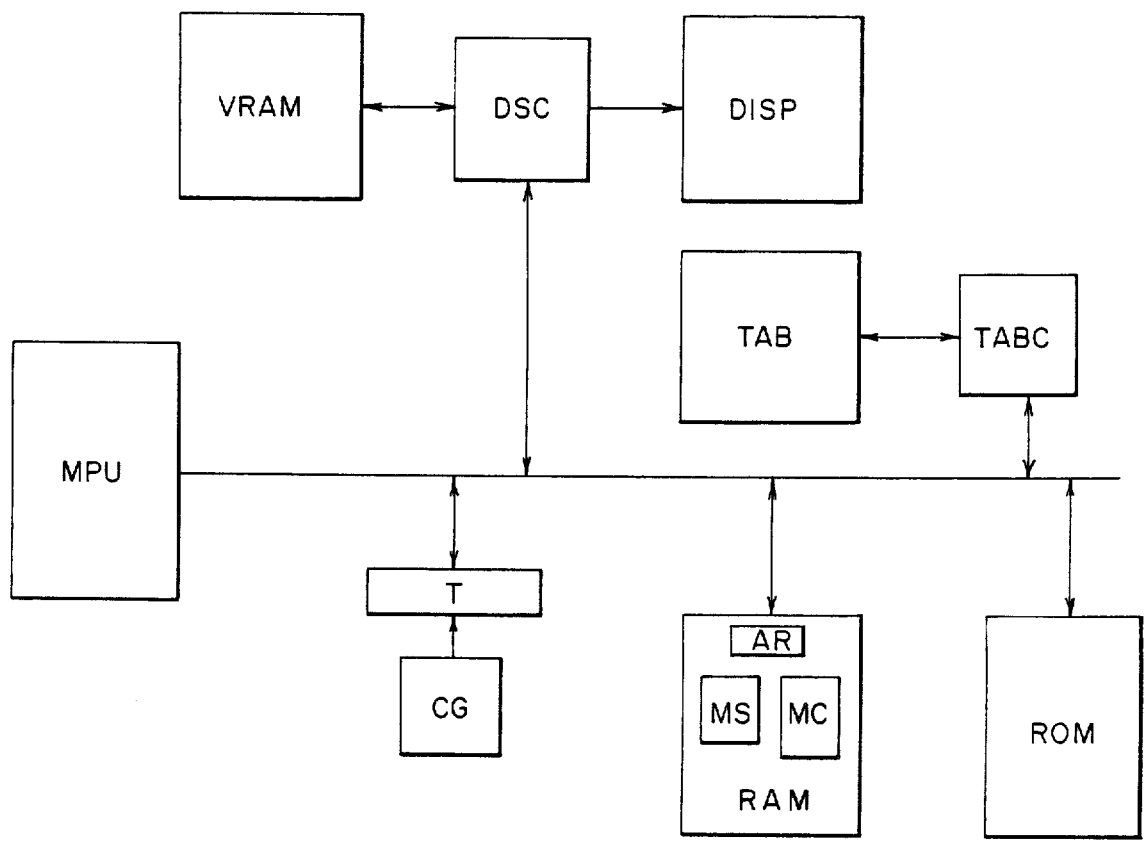
FIG. 2 is a block diagram of the schedule setting device according to the present invention.
Figures 5, 6:
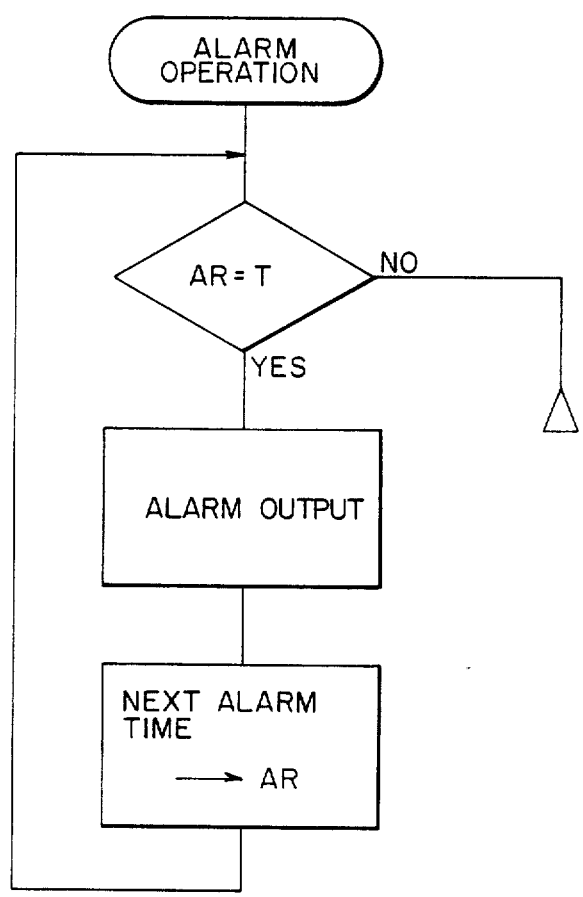

FIG. 2 is a block diagram of the schedule control device according to the present invention. The circuit of FIG. 2 comprises the following circuit elements:

MPU: a microprocessor unit
DSC: a display controller
DISP: a display such as a liquid crystal display
VRAM: a display memory for storing a bit pattern to be displayed
TAB: a tablet combined with the display DISP
TABC: a controller for the tablet TAB
T: a timekeeping circuit for counting current date and time information and its register
CG: a clock generator
RAM: a memory functioning as various flags, registers, buffers
ROM: a memory for storing a control program
FIGS. 3 and 6 are flow chart for executing a program stored within the ROM.
FIGS. 4 and 5 are a schematic representation of the contents of the RAM.
FIG. 3 is a flow chart for reading the information provided by the exciting pen. When the handwritten information is present within the time zone 3a, the locus information of the pen is read in the VRAM and the handwritten information in the schedule time zone 3a is inputted into a schedule information memory MS of the RAM. When the handwritten information is present in the schedule comment portion 3b, the locus information of the pen is read in the VRAM and the handwritten information in the schedule comment portion 3b is inputted into a comment memory MC of the RAM.

FIG. 4 shows the contents of the schedule memory MS. It stores the date information, schedule starting time, and schedule ending time in the form of figures. Upon input by the pen, these data are renewed.

FIG. 5 shows the contents of the comment information memory MC. Date information and schedule comment information are paired in the comment information memory MC. The schedule comment information is stored in the schedule comment memory MC in the form of stroke and vector information to thereby compress the storage data.

The contents of the schedule information memory MS and the schedule comment memory MC are reproduced to be inputted into the VRAM, so that the schedule information and the schedule comment information can be displayed in the display DISP as soon as the schedule information is written on the schedule note portion 1 of the liquid crystal display.

FIG. 6 is a flow chart for announcing an alarm.

FIG. 6, an alarm register AR is provided in the RAM for storing alarm time information to be outputted. A detection means is provided for detecting whether the alarm time information in the alarm register AR and the current time information in the register T are consistent or not. In response to the detection of consistency, an alarm is provided. The next alarm information to be outputted is read out of the schedule information memory MS and inputted into the alarm register AR.

It may be possible that the schedule period is specified by marking the schedule starting and ending time in a time zone as symbolic clock, instead of the above described line writing. Further, it may be possible that an alarm can be provided at 30 minutes prior to the schedule starting time, and the end of the scheduled time. Instead of alarm generation, any other processing such as data processing can be enabled.

While only certain embodiments of the present invention have been described, it will be apparent to those skilled in the art that various changes and modifications may be made therein without departing from the spirit and scope of the present invention as claimed.

What is claimed is:

1. A schedule setting device comprising:
    a schedule display containing predetermined schedule information, said predetermined schedule information including a time line and a date line perpendicularly arranged to create an input matrix;
    said input matrix including a time information zone and a comment information zone provided for each of a plurality of dates on said date line;
    a digitizer;
    a liquid crystal display panel superimposed on said digitizer, said liquid crystal display panel being provided for bearing said time and information zones;
    means for inputting handwritten time information corresponding to a desired alarm time into said time information zone;
    means for inputting handwritten comment information into said comment zone;
    means for determining the arrival of said desired alarm time; and
    means for developing an alarm signal upon determining the arrival of said desired alarm time.

2. A schedule setting method for a schedule setting device comprising the steps of:
    (a) writing time information into a time information zone for each of a plurality of dates;
    (b) writing comment information into a comment zone for each of said plurality of dates;
    (c) displaying said writing of time and comment information for visual confirmation thereof;
    (d) detecting the locus of said time and comment information;
    (e) storing said time and schedule information in a memory;
    (f) determining the arrival of a time corresponding to said time information of step (a); and
    (g) developing an alarm signal in response to determining the arrival of said time.

3. The schedule setting device according to claim 1, wherein said means for determining the arrival of said desired alarm time is a timekeeping circuit for counting current date and time information, said current and input time information being compared to determine the arrival of said desired alarm time.

* * * * *